(12) United States Patent
Nagura (10) Patent No.: US 7,843,774 B2
(45) Date of Patent: Nov. 30, 2010

(54) OPTICAL INFORMATION RECORDING AND REPRODUCING APPARATUS CAPABLE OF COMA ABERRATION CORRECTION

(75) Inventor: Chihiro Nagura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 640 days.

(21) Appl. No.: 11/557,547

(22) Filed: Nov. 8, 2006

(65) Prior Publication Data
US 2007/0104045 A1 May 10, 2007

(30) Foreign Application Priority Data
Nov. 10, 2005 (JP) .............................. 2005-326100

(51) Int. Cl.
*G11B 7/00* (2006.01)
(52) U.S. Cl. ............... 369/44.23; 369/44.32; 369/53.19
(58) Field of Classification Search .................. None
See application file for complete search history.

(56) References Cited

U.S. PATENT DOCUMENTS

| | | | |
|---|---|---|---|
| 5,886,496 A | 3/1999 | Furukawa et al. | 318/648 |
| 7,295,497 B2 | 11/2007 | Iijima | 369/44.32 |
| 2004/0081058 A1* | 4/2004 | Nagatomi et al. | 369/112.02 |
| 2004/0125711 A1* | 7/2004 | Sato et al. | 369/44.32 |
| 2005/0025000 A1* | 2/2005 | Ariyoshi et al. | 369/44.32 |
| 2005/0047291 A1* | 3/2005 | Kuze et al. | 369/44.32 |
| 2005/0094509 A1 | 5/2005 | Nagura | 369/44.37 |
| 2005/0243674 A1 | 11/2005 | Hirai | 369/53.23 |
| 2006/0198254 A1 | 9/2006 | Hirai et al. | |
| 2006/0280097 A1 | 12/2006 | Nagura | 369/112.01 |
| 2007/0121433 A1 | 5/2007 | Nagura | 369/44.11 |

(Continued)

FOREIGN PATENT DOCUMENTS

JP    11-3531    1/1999

(Continued)

OTHER PUBLICATIONS

Japanese Office Action dated Aug. 31, 2010, issued in counterpart Japanese patent application No. 2008-21126, with an English translation.

*Primary Examiner*—Peter Vincent Agustin
*Assistant Examiner*—Emily Frank
(74) *Attorney, Agent, or Firm*—Fitzpatrick, Cella, Harper & Scinto (57) ABSTRACT

An optical information recording and reproducing apparatus for performing, using a light beam, recording of information or reproducing of recorded information with respect to a plurality of recording layers of an information recording medium. An objective lens condenses a light beam onto the recording layers. A light beam expander corrects spherical aberration caused by a difference in substrate thickness by changing one of a divergent angle and a convergent angle of a light beam entering the objective lens. A coma aberration correcting device corrects coma aberration caused by tilt of the recording medium. A drive circuit drives the coma aberration correcting device with a drive signal having a value varied depending on an amount of coma aberration caused in accordance with one of a divergent angle and a convergent angle of the light beam expander, which varies for each recording layer, and an amount of coma aberration caused in each recording layer due to a transmission thickness from a light incidence surface of the recording medium to the recording layers.

9 Claims, 10 Drawing Sheets

U.S. PATENT DOCUMENTS

2008/0049577 A1    2/2008    Iijima et al. .............. 369/53.12

FOREIGN PATENT DOCUMENTS

| | | |
|---|---|---|
| JP | 2000-003526 | 1/2000 |
| JP | 2000-090479 | 3/2000 |
| JP | 2003-338056 | 11/2003 |
| JP | 2004-206763 A | 7/2004 |
| JP | 2005-108398 | 4/2005 |
| JP | 2005-209283 | 8/2005 |
| JP | 2005-235265 | 9/2005 |

* cited by examiner

OPTICAL INFORMATION RECORDING AND REPRODUCING APPARATUS CAPABLE OF COMA ABERRATION CORRECTION

This application claims the benefit of Japanese Patent Application No. 2005-326100, filed Nov. 10, 2005, which is hereby incorporated by reference herein in its entirety.

BACKGROUND OF THE INVENTION

1. Field of the Invention

The present invention relates to an optical information recording and reproducing apparatus for performing recording of information or reproducing of recorded information with respect to an optical information recording medium. In particular, the present invention relates to a coma aberration correcting technique when information is recorded on or reproduced from an information recording medium having a plurality of recording layers.

2. Description of the Related Art

In recent years, the demand for increased capacity of an optical disc has been increasing. In order to improve the recording density of an optical disc, it is effective, for example, to reduce the diameter of a light beam spot by increasing the numerical aperture (NA) of an objective lens. In recent years, a system in which the NA of an object lens is 0.85 has been put to practical use.

Further, a multilayered recording layer of an optical disc is also extremely effective for increasing the capacity, because the capacity is doubled with almost no change in an optical system. However, because the amount of spherical aberration caused due to a difference in substrate thickness is proportional to $NA^4$, the influence of the spherical aberration is remarkably increased as the NA becomes larger. For example, in an optical system in which the wavelength is 405 nm and the NA is 0.85, because a substrate thickness error of several μm exceeds a diffraction limit, even a single-layer disc requires spherical aberration correction.

When a recording layer of an optical disc is multilayered, an interlayer distance of 10 μm or more is necessary, which further increases the amount of spherical aberration correction. As a means for correcting spherical aberration, a light beam expander, which changes a divergent angle or a convergent angle of light entering an objective lens, has been put to practical use.

Further, recently, in order to improve a system margin, providing a mechanism for correcting coma aberration is becoming the mainstream for products including DVDs for recording. A method of tilting an entire optical pickup is conventionally used for correcting coma aberration. However, since the portion to be tilted is large and heavy, spaces for providing a mechanism for driving the tilt and a driving source are necessary, and thus, there is a problem that the apparatus becomes larger.

On the other hand, a method of tilting only an object lens and a method of correcting coma by a liquid crystal have been put to practical use. In the method of tilting only an objective lens, the objective lens is mounted on a tilt actuator. By tilting the objective lens according to the amount of disc tilt, coma aberration is corrected.

In the case of an ordinary objective lens and an infinite optical system, Japanese Patent Application Laid-Open No. 2005-108938 discloses that the amount of coma aberration caused due to disc tilt and the amount of coma aberration caused due to objective lens tilt are almost equal to each other. Therefore, by driving the disc and the objective lens such that the disc and the objective lens are in parallel with each other, coma aberration can be substantially optimally corrected.

A method disclosed in Japanese Patent Application Laid-Open No. 2000-090479 is an exemplary method of correcting coma by a liquid crystal. In Japanese Patent Application Laid-Open No. 2000-090479, a liquid crystal element has a plurality of pattern electrodes which correspond to the shape of distribution of coma aberration caused due to disc tilt. By changing the voltage applied to the liquid crystal element according to the amount of disc tilt, a coma aberration of an opposite sign is generated, to correct coma aberration.

It is expected that, in accordance with the recent trend toward a larger NA of an objective lens, and toward a multi-layered optical disc as described above, an optical pickup will be required to have a mechanism for simultaneously correcting both coma aberration and spherical aberration.

When spherical aberration is corrected by creating uncollimated light using a light beam expander as described above, the ratio of the amount of coma aberration caused due to disc tilt to the amount of coma aberration caused due to objective lens tilt varies according to a transmission layer thickness of the disc.

Therefore, when a read/write operation is performed on a multilayer disc under different conditions of the transmission layer thickness, an optimal amount of lens tilt or an optimal voltage to be applied to the liquid crystal element varies depending on the layer, and, if coma aberration is corrected by the same amount of lens tilt or the same voltage to be applied to the liquid crystal element, coma aberration remains in some of the layers, which lowers the imaging performance, and prevents stable recording and reproducing.

SUMMARY OF THE INVENTION

An object of the present invention is to provide an optical information recording and reproducing apparatus, which can realize stable recording and/or reproducing in the respective recording layers of a multilayer recording medium, even when coma aberration is corrected with regard to the respective recording layers.

According to an aspect of the present invention, an optical information recording and reproducing apparatus for performing, using a light beam, recording of information or reproducing of recorded information, with respect to a plurality of recording layers of an information recording medium, includes an objective lens for condensing a light beam onto the recording layers, a light beam expander for correcting spherical aberration caused due to a difference in substrate thickness by changing a divergent angle or a convergent angle of a light beam entering the objective lens, a coma aberration correcting mechanism for correcting coma aberration caused by tilt of the recording medium, and a drive circuit for driving the coma aberration correcting mechanism with a drive signal having a value varied depending on the recording layers of the recording medium.

Further features of the present invention will become apparent from the following description of exemplary embodiments with reference to the attached drawings.

DESCRIPTION OF THE EMBODIMENTS

A best mode for carrying out the present invention is now described in detail with reference to the drawings.

First Embodiment

Figure 1:
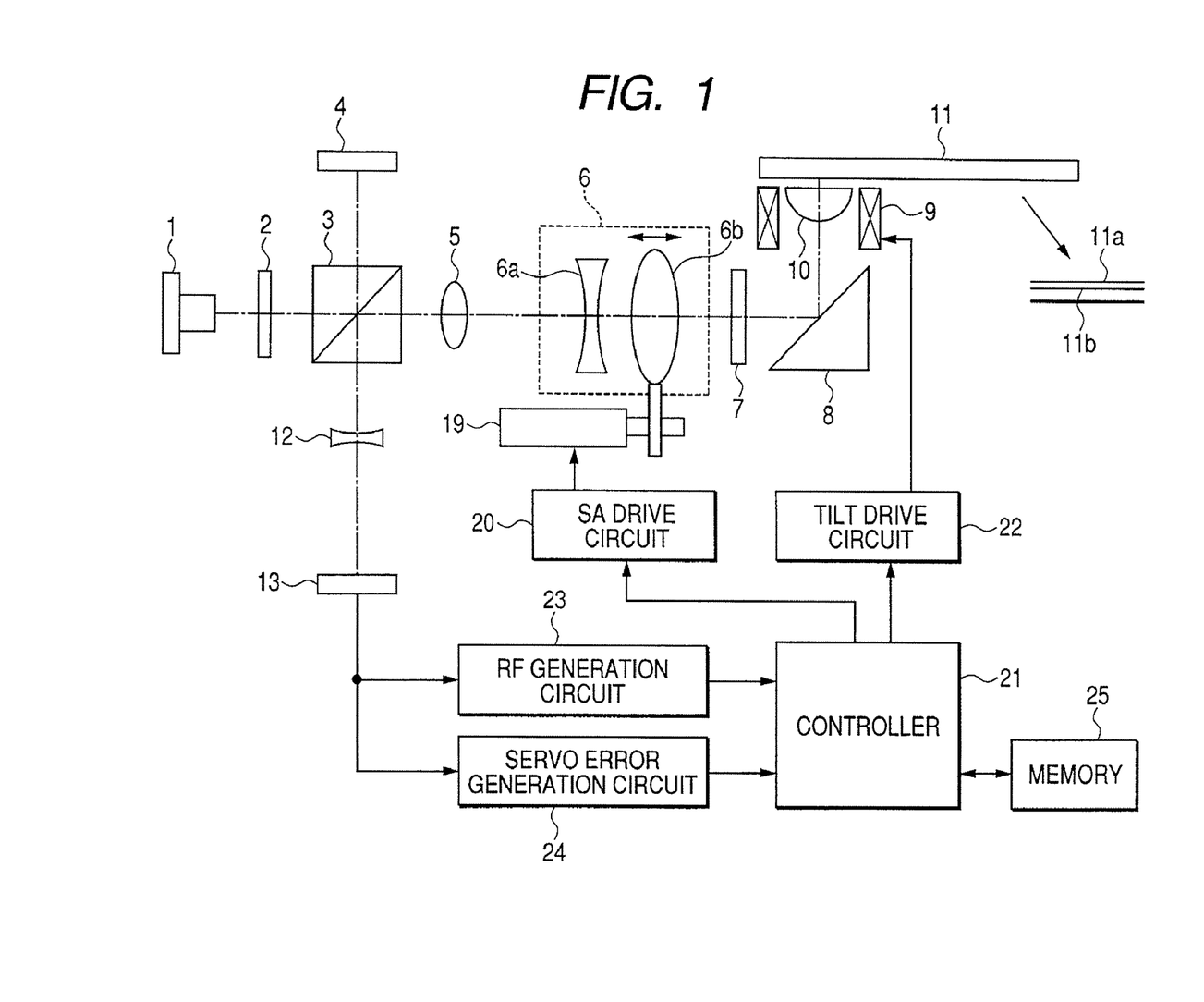
FIG. 1 is a block diagram illustrating an optical information recording and reproducing apparatus according to a first embodiment of the present invention.

FIG. 1 is a block diagram illustrating a first embodiment of an optical information recording and reproducing apparatus according to the present invention. In the figure, a semiconductor laser 1, as a light source, has a wavelength of, for example, 405 nm. An optical disc 11 as an information recording medium is a two layer disc having a first layer 11a and a second layer 11b, as recording layers, as illustrated in FIG. 1. The second layer 11b is on the side of incident light, and has a transmission layer thickness of 70 μm. The first layer 11a is a recording layer opposite to the side incident light, and has a transmission layer thickness of 100 μm.

Reference numerals 2, 3, 4, and 5 designate a diffraction grating, a polarized light beam splitter, a sensor for a front monitor, and a collimator lens, respectively. A light beam expander 6 is used for correcting spherical aberration, and is formed of a concave lens 6a and a convex lens 6b.

The convex lens 6b of the two lenses is movable in the direction of an optical axis by being driven by a drive mechanism 19 to change the distance between the concave lens 6a and the convex lens 6b. Alternatively, the other lens, or the concave lens 6a, may be movable in the direction of the optical axis.

The drive mechanism 19 includes a driving source, such as a stepping motor, and a gear mechanism, for converting the driving force of the driving source to rectilinear motion of the convex lens 6b in the direction of the optical axis. A controller 21 controls an SA drive circuit 20, and corrects spherical aberration in the respective recording layers of the optical disc 11, by driving the drive mechanism 19, to adjust the position of the convex lens 6b in the direction of the optical axis.

Reference numerals 7, 8, 9, and 10 denote a quarter wavelength plate, a lift mirror, an objective lens actuator, and an objective lens, respectively. The NA of the objective lens 10 is 0.85, and is designed such that, when the transmission layer thickness is 100 μm, no aberration is caused in an infinite system.

The objective lens actuator 9 is an actuator with a drive mechanism having three axes: two-axis translation in the direction of focus and in the radial direction of the optical disc 11, and tilt in the radial direction of the optical disc 11. The objective lens 10 is mounted on the objective lens actuator 9. A drive signal is supplied from a tilt drive circuit 22 to a tilt coil of the objective lens actuator 9 under control of a controller 21. Coma aberration is corrected by tilting the objective lens 10.

Further, reference numeral 12 denotes a sensor lens and reference numeral 13 denotes an RF servo sensor. An RF generation circuit 23 generates an RF reproduction signal from an output of the RF servo sensor 13, as described below. Similarly, a servo error generation circuit 24 generates a focus error signal and a tracking error signal from an output of the RF servo sensor 13.

The controller 21 is a control circuit for controlling respective portions in the apparatus, and performs control for writing information on or reading information from the respective recording layers of the optical disc 11. Further, as described in detail below, the controller 21 performs control for correcting spherical aberration, control for correcting coma aberration, and the like. A memory 25 stores a drive signal value for correcting coma aberration with regard to the respective recording layers of the optical disc 11.

Further, the controller 21 drives a focus actuator and a tracking actuator of the objective lens actuator 9, based on the focus error signal and the tracking error signal described above, to perform focus control and tracking control. In FIG. 1, a detailed structure of such servo control is omitted.

Also, in FIG. 1, a modulation circuit for modulating recorded data according to a predetermined modulation system, a laser device circuit for driving the semiconductor laser 1 according to a record signal from the modulation circuit, a demodulation circuit for performing demodulation, and the like, are omitted. Further, mechanisms, such as a spindle motor for rotatably driving the optical disc 11, are also omitted.

Light beams emitted from the semiconductor laser 1 pass through the diffraction grating 2, are split into three, and enter the polarized light beam splitter 3. A portion of the light beams, which enter the polarized light beam splitter 3, are reflected and enter the sensor 4 for a front monitor. Based on an output from the sensor 4 for a front monitor, APC control over an output of the semiconductor laser 1 is performed.

The light beams, which pass through the polarized light beam splitter 3, are made to be collimated light beams by the two collimator lens 5. Collimated light beams, which have passed the collimator lens 5, enter the light beam expander 6, which is formed of the concave lens 6a and the convex lens 6b. As described above, in the light beam expander 6, the convex lens 6b is movable in the direction of the optical axis, such that the divergent angle or the convergent angle of light beams entering the objective lens 10 can be changed.

Light beams which have passed through the light beam expander 6 pass through the quarter wavelength plate 7, are reflected off the lift mirror 8, and then, are condensed onto an information recording surface of the optical disc 11 by the objective lens 10. Reflected light beams from the optical disc 11 enter the polarized light beam splitter 3 through the objective lens 10, the lift mirror 8, the quarter wavelength plate 7, and the light beam expander 6.

The incident light is reflected by the polarized light beam splitter 3, and is condensed onto the RF servo sensor 13 through the sensor lens 12. As described above, an RF reproduction signal, a focus error signal, a tracking error signal, and the like, are obtained from an output of the RF servo sensor 13.

Figure 2:
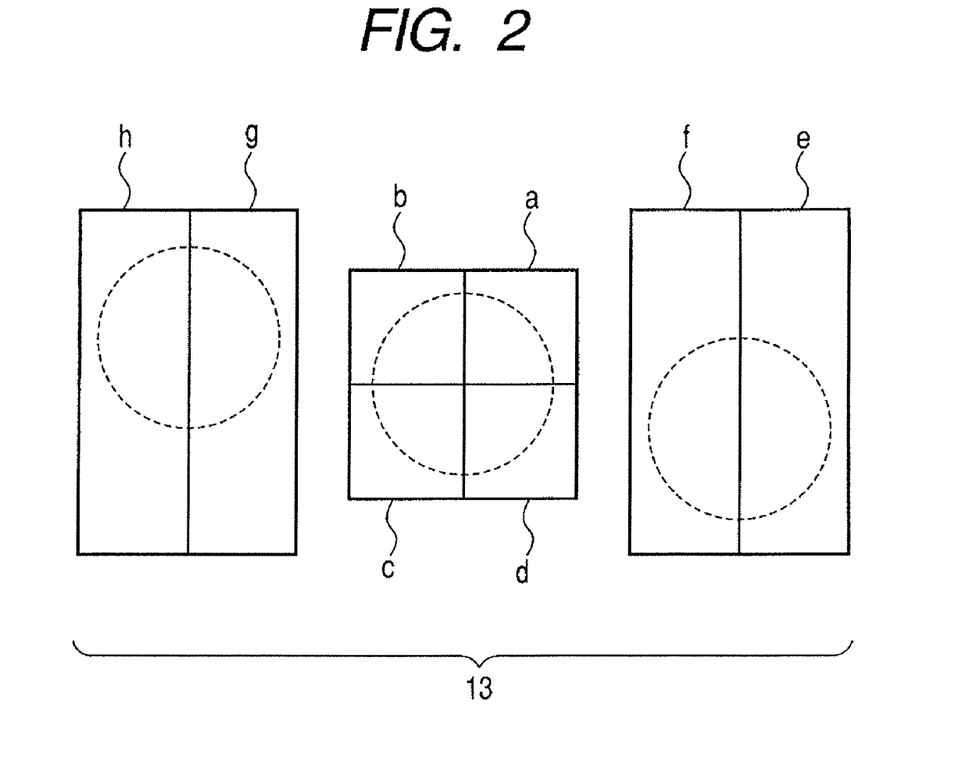
FIG. 2 illustrates a light receiving surface of an RF servo sensor.

FIG. 2 illustrates a light receiving surface of the RF servo sensor 13. The RF servo sensor 13 includes a sensor divided into four in the center, and sensors each divided into two on both sides. Assuming that outputs from light receiving surfaces a-h of the RF servo sensor 13 are represented by A-H, respectively, according to an astigmatism method, a focus error signal FE is obtained by the following equation:

$$FE=(A+C)-(B+D) \quad (1)$$

According to a differential push-pull method, a tracking error signal TE is obtained by the following equation:

$$TE=\{(A+D)-(B+C)\}-k\{(F-E)+(H-G)\}. \quad (2)$$

The focus error signal and the tracking error signal are generated by the servo error generation circuit 24 and are outputted to the controller 21. It should be noted that the tracking error signal obtained by equation (2) is referred to as a push-pull signal. Based on the amplitude of the push-pull signal, coma aberration is corrected with regard to the respective recording layers of the optical disc 11.

Further, an RF reproduction signal is obtained by the following equation, as a total sum of the outputs from the sensor divided into four:

$$RF \text{ reproduction signal}=A+B+C+D. \quad (3)$$

As described above, the RF reproduction signal is generated by the RF generation circuit 23 and is outputted to the controller 21.

As described in detail below, the controller 21 detects the amplitude of a push-pull signal when the amount of tilt is optimized at turn-on, or the like, and finds a drive signal value with which the amplitude of the push-pull signal with regard to each of the recording layers of the optical disc 11 becomes the largest. By applying a drive signal having that value to the tilt coil with regard to teach of the recording layers in recording or reproducing, coma aberration is corrected.

As described below, the controller 21 also detects the amplitude of an RF reproduction signal, and, by adjusting the position of the convex lens 6b such that the amplitude of the RF reproduction signal becomes the largest, spherical aberration is corrected with regard to each of the recording layers of the optical disc 11.

Figure 3:
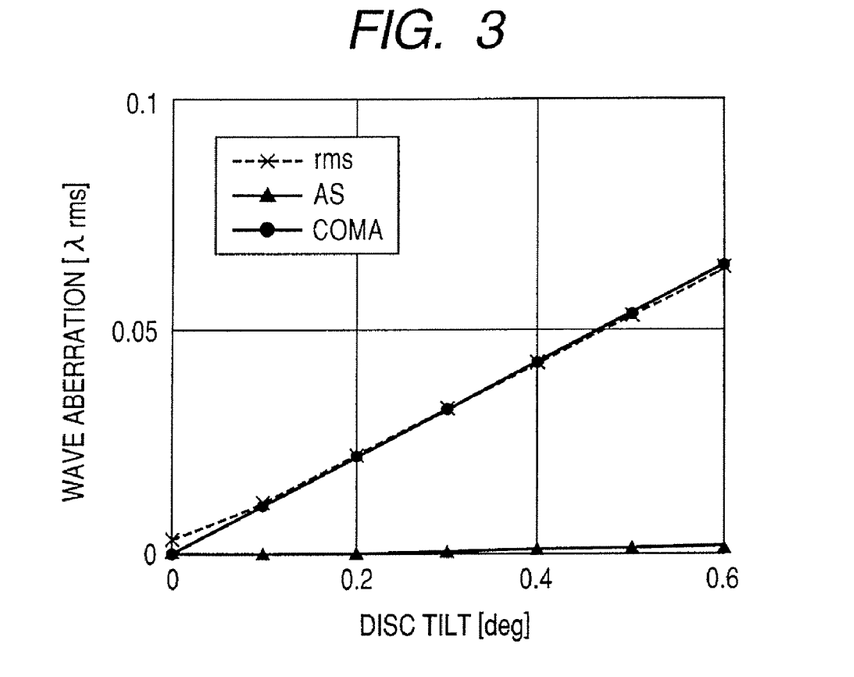
FIG. 3 is a graph of aberration versus disc tilt, when light beams are condensed onto a first layer of an optical disc, and spherical aberration is optimized by a light beam expander.
Figure 4:
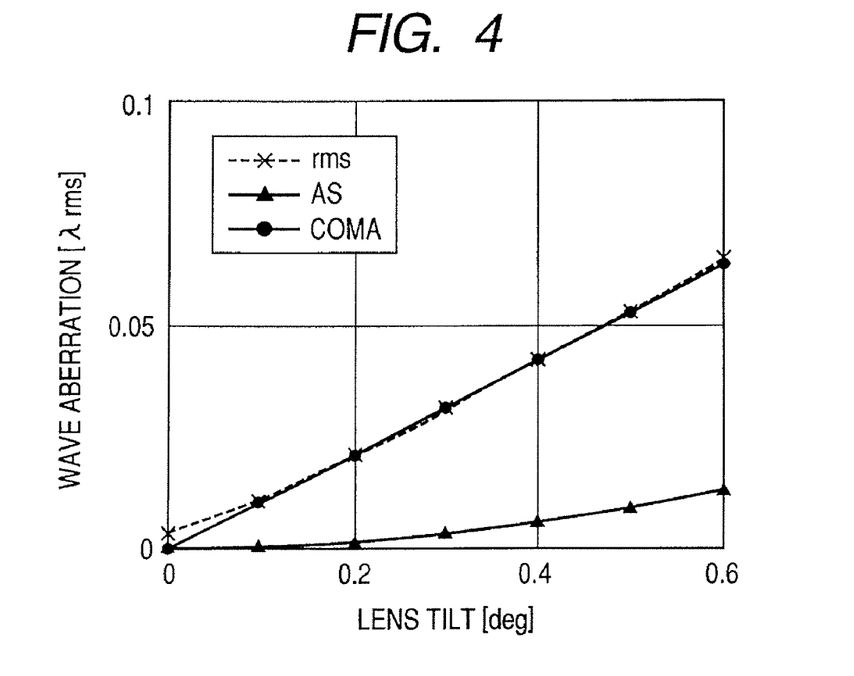
FIG. 4 is a graph of aberration versus objective lens tilt, when light beams are condensed onto the first layer of the optical disc, and spherical aberration is optimized by the light beam expander.

FIGS. 3 and 4 are graphs of aberration versus disc tilt and aberration versus objective lens tilt, respectively, when light beams from the semiconductor laser 1 are condensed onto the first layer 11a of the optical disc 11, and spherical aberration is optimized by the light beam expander 6.

The term "rms" in the explanatory legends is an acronym of the "root mean square error" of wave aberration, while the terms "COMA" and "AS" are root mean square errors of a third-order coma aberration component and of a third-order astigmatism component, respectively. FIGS. 3 and 4 show that an amount substantially equal to the amount of disc tilt is the optimal amount of objective lens tilt.

Figure 5:
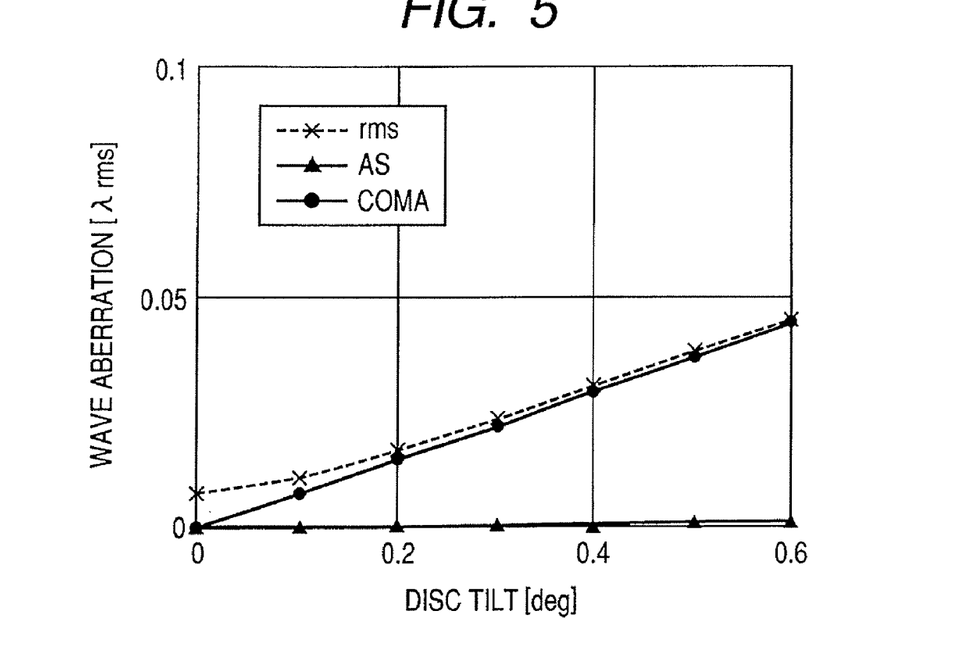
FIG. 5 is a graph of aberration versus disc tilt, when light beams are condensed onto a second layer of the optical disc, and spherical aberration is optimized by the light beam expander.
Figure 6:
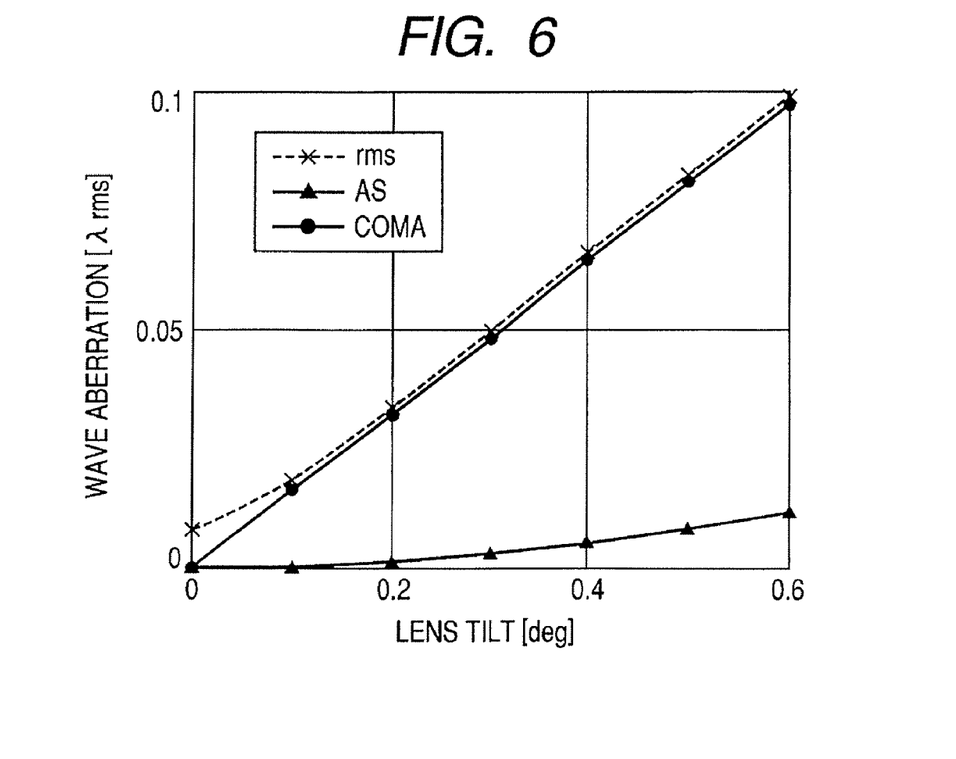
FIG. 6 is a graph of aberration versus objective lens tilt, when light beams are condensed onto the second layer of the optical disc, and spherical aberration is optimized by the light beam expander.

Similarly, FIGS. 5 and 6 are graphs of aberration versus disc tilt and aberration versus objective lens tilt, respectively, when light beams from the semiconductor laser 1 are condensed onto the second layer 11b of the optical disc 11, and spherical aberration is optimized by the light beam expander 6.

FIGS. 5 and 6 show that when, for example, the objective lens is tilted by 0.5 degrees, a coma aberration of 81 mλrms is caused, but, when the optical disc 11 is tilted by 0.5 degrees, a coma aberration of only 37 mλrms is caused.

Figure 7:
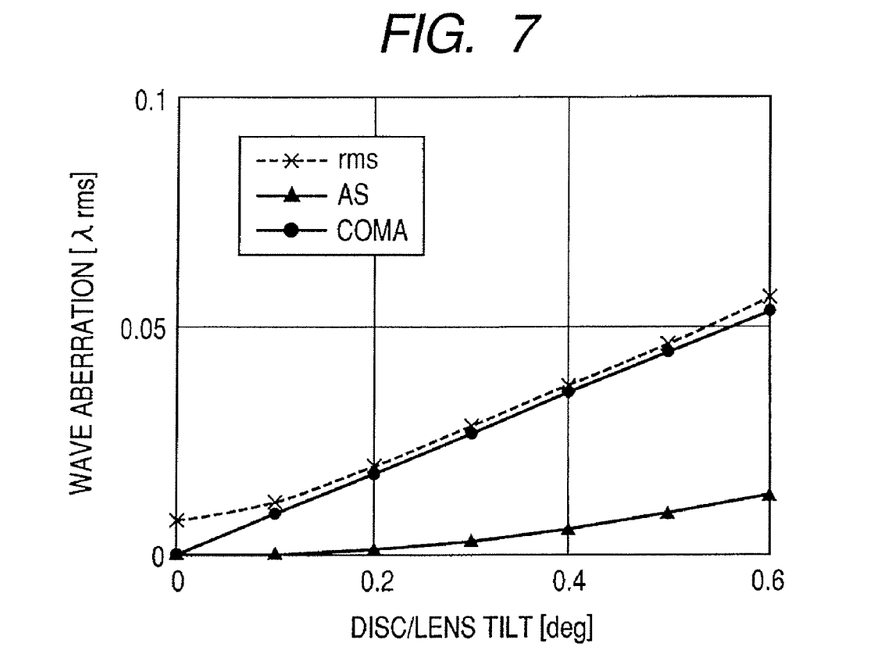
FIG. 7 is a graph illustrating a change in aberration in a case when the amount of objective lens tilt is the same as that of disc tilt, when light beams are condensed onto the second layer of the optical disc, and spherical aberration is optimized by the light beam expander.

FIG. 7 is a graph illustrating a change in aberration in a case when an objective lens tilt whose amount is the same as that of the disc tilt is given in the second layer 11b of the optical disc 11. As is apparent from FIG. 7, in the second layer 11b of the optical disc 11, when disc tilt of 0.5 degrees is corrected by objective lens tilt of the same amount, coma aberration of 44 mλrms remains.

Figure 8:
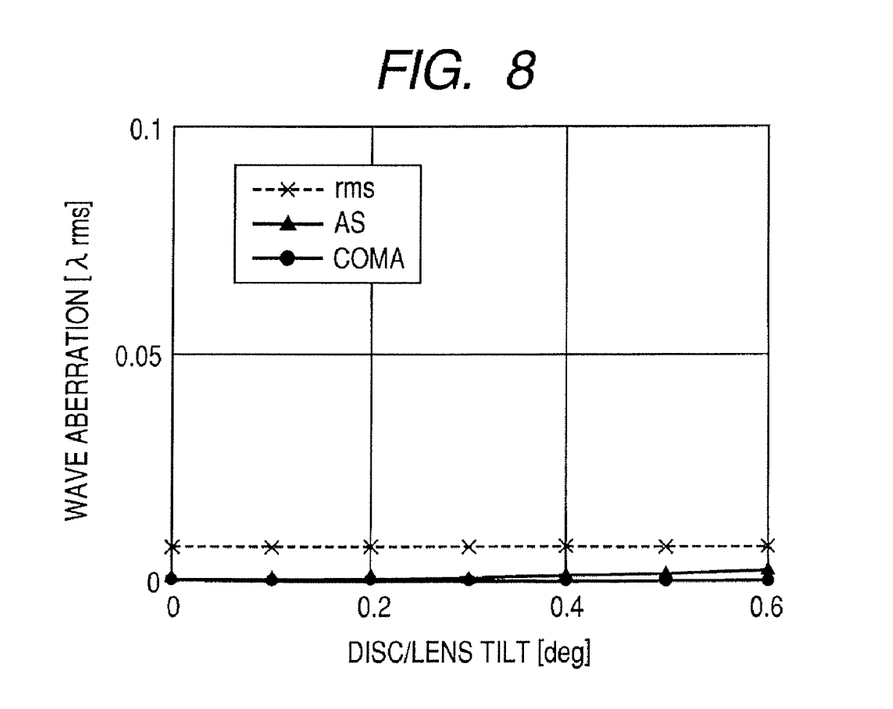
FIG. 8 is a graph illustrating a change in aberration when light beams are condensed onto the second layer of the optical disc, and spherical aberration is optimized by the light beam expander.

FIG. 8 is a graph illustrating a change in aberration in a case when objective lens tilt, whose amount is 0.45 times as much as that of tilt of the optical disc 11, is given. As is apparent from FIG. 8, by making the amount of tilt of the objective lens 10 in the second layer 11b 0.45 times as much as that of the first layer 11a, coma aberration can be almost perfectly corrected, and, even when the optical disc 11 is tilted by 0.6 degrees or more, coma aberration is within 8 mλrms. In this embodiment, coma aberration is corrected by tilting the objective lens 10.

Further, according to a second embodiment of the present invention, as described below, by making the amount of tilt of the objective lens 10 in the second layer 11b of the optical disc 11 0.45 times as much as that of the first layer 11a, optimization of the amount of objective lens tilt is simplified.

Next, operation of this embodiment is now described. When power is turned on, when a disc is changed, or the like, the amount of objective lens tilt is optimized. First, the controller 21 controls the SA drive circuit 20 and the position of the convex lens 6b of the light beam expander 6 is adjusted, such that spherical aberration is corrected in the first layer 11a of the optical disc 11, and the first layer 11a is brought into focus.

To be specific, the controller 21 controls the drive circuit 20 and, by driving the drive mechanism 19, the convex lens 6b is moved in the direction of the optical axis. A generated RF reproduction signal is inputted the controller 21 from the RF generation circuit 23, and the amplitude of the RF reproduction signal is detected. Then, the controller 21 adjusts the position of the convex lens 6b, such that the amplitude of the RF reproduction signal becomes the largest. In this way, spherical aberration in the first layer 11a is corrected. In the description below, spherical aberration in the respective recording layers of the optical disc 11 is corrected in a similar way.

Further, the controller 21 controls the tilt drive circuit 22, and applies a drive voltage to the tilt coil of the objective lens actuator 9. A push-pull signal is inputted to the controller 21 from the servo error generation circuit 24, with the amount of tilt being varied by changing the drive voltage, and the amplitude of the push-pull signal is detected to find the optimal drive voltage. That is, the controller 21 finds a drive voltage value with which the amplitude of the push-pull signal becomes the largest, and the value is the optimal drive signal value.

Next, the controller 21 adjusts the position of the convex lens 6b of the light beam expander 6 to the second layer 11b of the optical disc 11, and the second layer 11b is brought into focus. In this case, similarly, the position of the convex lens 6b is adjusted, such that the amplitude of the RF reproduction signal becomes the largest.

Further, similarly, the controller 21 controls the tilt drive circuit 22, the amplitude of the push-pull signal is detected with the amount of tilt being varied, and the drive voltage with which the amplitude of the push-pull signal becomes the largest is detected as the optimal drive signal. The optimal drive signal values for the first layer 11a and the second layer 11b of the optical disc 11, respectively, are stored in the memory 25.

Then, when data is written to or read from the optical disc 11, according to the recording layer brought into focus of the optical disc 11, the corresponding drive signal stored in the memory 25 is applied to the tilt coil of the objective lens actuator 9.

First, when data is written to or read from the first layer 11a of the optical disc 11, the controller 21 controls the tilt drive circuit 22, such that a drive signal, having the optimal drive signal value corresponding to the first layer 11a and stored in the memory 25, is applied to the tilt coil of the objective lens actuator 9. Next, the controller 21 adjusts the position of the convex lens 6b of the light beam expander 6 for correcting spherical aberration in the first layer 11a of the optical disc 11, and the first layer 11a is brought into focus. After that, tracking control is performed to the target track to read or to write data with respect thereto.

When the read/write operation is performed on the second layer 11b of the optical disc 11, similarly, a drive signal having the optimal drive signal value corresponding to the second layer 11b and stored in the memory 25 is applied by the tilt drive circuit 22 to the tilt coil of the objective lens actuator 9. Next, the position of the convex lens 6b of the light beam expander 6 is adjusted for correcting spherical aberration in the second layer 11b of the optical disc 11, and the second layer 11b, is brought into focus. Further, tracking control is performed to the target track to read or to write data with respect thereto.

It should be noted that, in this embodiment, a push-pull signal is used as an indicator of optimization of the tilt, but any indicator may be used, insofar as the signal is related to the amount of tilt. For example, the amplitude of an RF reproduction signal may be used. Further, in this embodiment, a two layer medium is used, but the present invention may also be applied to a multilayer medium having three or more layers.

In this embodiment, different amounts of objective lens tilt are given to a plurality of recording layers of the optical disc 11. Thus, even when large spherical aberration is corrected, the correction is not affected by fluctuations in the amount of coma aberration caused due to entry of finite light beams, and stable recording or reproducing in the respective layers of a multilayer medium can be conducted.

Second Embodiment

Next, a second embodiment according to the present invention is described. The structure of the second embodiment is similar to the one illustrated in FIG. 1, and a method of detecting a servo error signal, and the like, are similar to those in the first embodiment, and thus, a detailed description thereof is omitted. This embodiment simplifies optimization of the amount of objective lens tilt.

As is apparent from FIG. 8, by making the amount of tilt of the objective lens in the second layer 11b of the optical disc 11 be 0.45 times as much as that of the first layer 11a, coma aberration can be substantially completely corrected and, even when the disc is tilted by 0.6 degrees or more, coma aberration is within 8 mλrms. Therefore, in this embodiment, by making the correction factor of the amount of tilt of the second layer 11b in relation to the first layer 11a of the optical disc 11, optimization of the amount of objective lens tilt of the second layer 11b is omitted.

Next, when performing recording or reproducing on the optical disc 11, similarly, when power is turned on, when a disc is changed, or the like, optimization of the amount of objective lens tilt is performed. Here, optimization of the first layer 11a of the optical disc 11 is similar to that in the first embodiment.

Namely, the controller 21 adjusts the position of the convex lens 6b of the light beam expander 6 in order to correct spherical aberration of the first layer 11a of the optical disc 11, and the first layer 11a is brought into focus. The tilt drive circuit 22 applies drive voltage to the tilt coil of the objective lens actuator 9. The amplitude of a push-pull signal is detected with the amount of tilt being varied by changing the drive voltage, and the optimal drive signal value is found with which the amplitude of the push-pull signal becomes the largest. The obtained optimal drive signal value is, similarly, stored in the memory 25.

When the read/write operation is performed on the first layer 11a of the optical disc 11, the tilt drive circuit 22 applies to the tilt coil of the objective lens actuator 9 the drive signal having the optimal drive signal value for the first layer 11a stored in the memory 25. Then, the position of the convex lens 6b of the light beam expander 6 is adjusted for correcting spherical aberration in the first layer 11a of the optical disc 11, and the first layer 11a is brought into focus. After that, information is written to or read from the first layer 11a of the optical disc 11.

When the read/write operation is performed on the second layer 11b of the optical disc 11, the tilt drive circuit 22 applies to the tilt coil of the objective lens actuator 9 a drive signal having a value obtained by multiplying the optimal drive signal value for the first layer 11a by the above-mentioned tilt correction factor of 0.45. Further, the position of the convex lens 6b is adjusted for correcting spherical aberration in the second layer 11b of the optical disc 11, and the second layer 11b is brought into focus to read or to write information with respect thereto.

According to this embodiment, because, when power is turned on or when a disc is changed, the tilt optimization has to be performed only with regard to the first layer 11a of the optical disc 11, in addition to the effect of the first embodiment, the time necessary for startup of the apparatus can be shortened.

Third Embodiment

Figure 9:
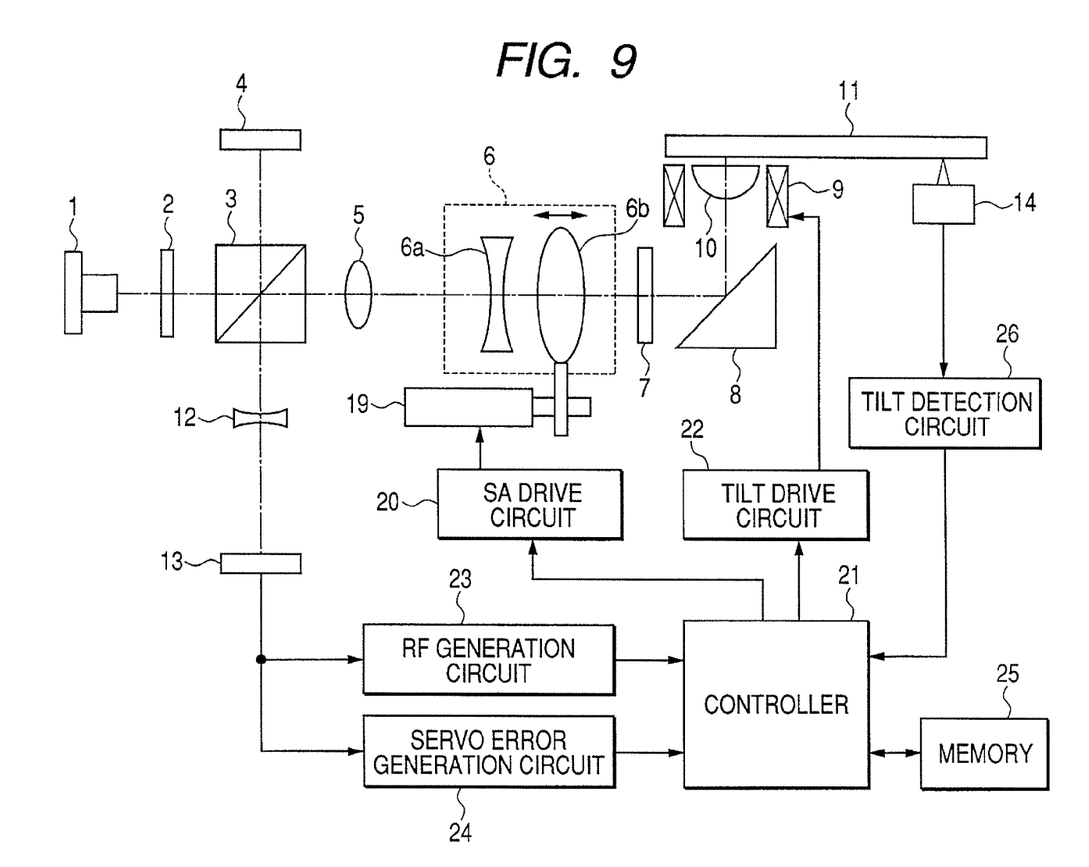
FIG. 9 is a block diagram illustrating an optical information recording and reproducing apparatus according to a third embodiment of the present invention.

FIG. 9 is a block diagram illustrating an optical information recording and reproducing apparatus according to a third embodiment of the present invention. A method of detecting a servo error signal, and the like, are similar to those in the first embodiment illustrated in FIG. 1, but this embodiment differs from the first embodiment, in that an optical tilt sensor 14 for detecting disc tilt is mounted on a fixed portion of an optical system. The tilt detection circuit 26 detects the amount of disc tilt based on a tilt signal of the optical tilt sensor 14. It should be noted that, in FIG. 9, like numerals are used to designate like or identical numbers illustrate in FIG. 1, and a description thereof is omitted.

The semiconductor laser 1 has a wavelength of 405 nm. The first layer 11a and the second layer 11b of the optical disc 11 have substrate thicknesses of 100 µm and 70 µm, respectively. The NA of an objective lens 10 is 0.85, and is designed such that, when the transmission layer thickness is 100 µm, no aberration is caused in an infinite system.

Figure 10:
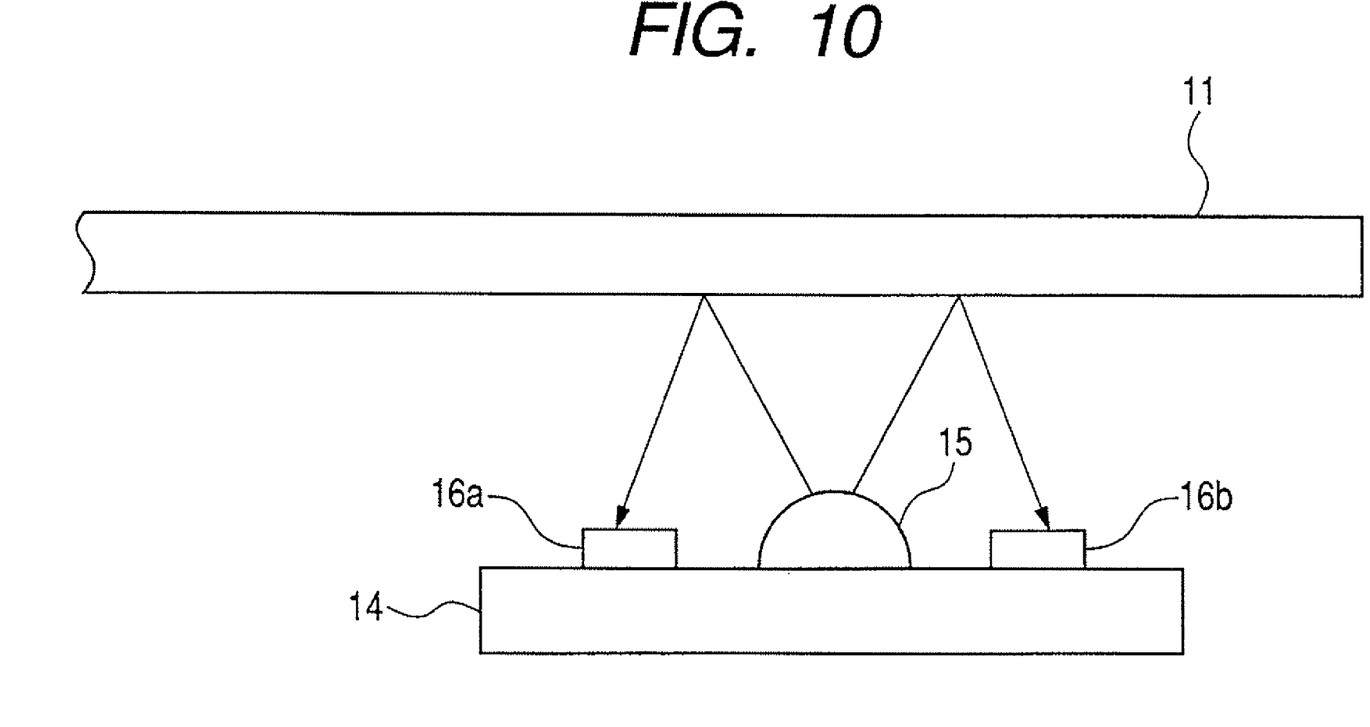
FIG. 10 illustrates an exemplary optical tilt sensor.

The structure of the optical tilt sensor 14 for detecting disc tilt is illustrated in FIG. 10. As is well known, the optical tilt sensor 14 includes an LED 15 and two photodiodes 16a and 16b, and an output depending on the relative angle of a recording surface of the disc with respect to an optical pickup is obtained. Light emitted from the LED 15 enters the optical disc 11 substantially perpendicularly.

Light reflected off the recording surface of the optical disc 11 is detected by light receiving surfaces of the two photodiodes 16a and 16b disposed symmetrically in a radial direction of the optical disc with respect to a light emitting portion of the LED 15. A tilt signal is obtained from the difference between outputs of the two photodiodes.

Next, coma aberration correction is described. First, a case when the read/write operation is performed on the first layer 11a of the optical disc 11 is described. First, the tilt detection circuit 26 calculates the amount of disc tilt from the output of the optical tilt sensor 14.

The controller 21 calculates, based on the amount of disc tilt and a design value of sensitivity for tilt drive, a drive voltage of the tilt coil with which the optical disc 11 and the objective lens 10 are in parallel with other, and makes the tilt drive circuit 22 apply the drive voltage to the tilt coil of the objective lens actuator 9.

Further, similarly, spherical aberration in the first layer 11a of the optical disc 11 is corrected, and the first layer 11a is brought into focus to read or to write information with respect thereto.

Next, a case when the read/write operation is performed on the second layer 11b of the optical disc 11 is described. The tilt detection circuit 26 calculates the amount of disc tilt from an output of the optical tilt sensor 14. Further, similarly, the controller 21 calculates, based on the amount of disc tilt and a design value of sensitivity for tilt drive, a drive voltage with which the optical disc 11 and the objective lens 10 are in parallel with each other.

Further, the controller 21 makes the tilt drive circuit 22 apply to the tilt coil of the objective lens actuator 9 a drive voltage obtained by multiplying the above drive voltage by the tilt correction factor k. After that, similarly, spherical aberration in the second layer 11b of the optical disc 11 is corrected, and the second layer 11b is brought into focus to read or to write information with respect thereto. As described above, the tilt correction factor k of the second layer 11b (having a transmission layer thickness of 70 µm) of the optical disc 11 is 0.45.

As described above, according to this embodiment, because stable recording or reproducing can be started without tilt optimization when power is turned or when a disc is changed, in addition to the effect of the first embodiment, the time necessary for startup can be further shortened.

Fourth Embodiment

Figure 11:
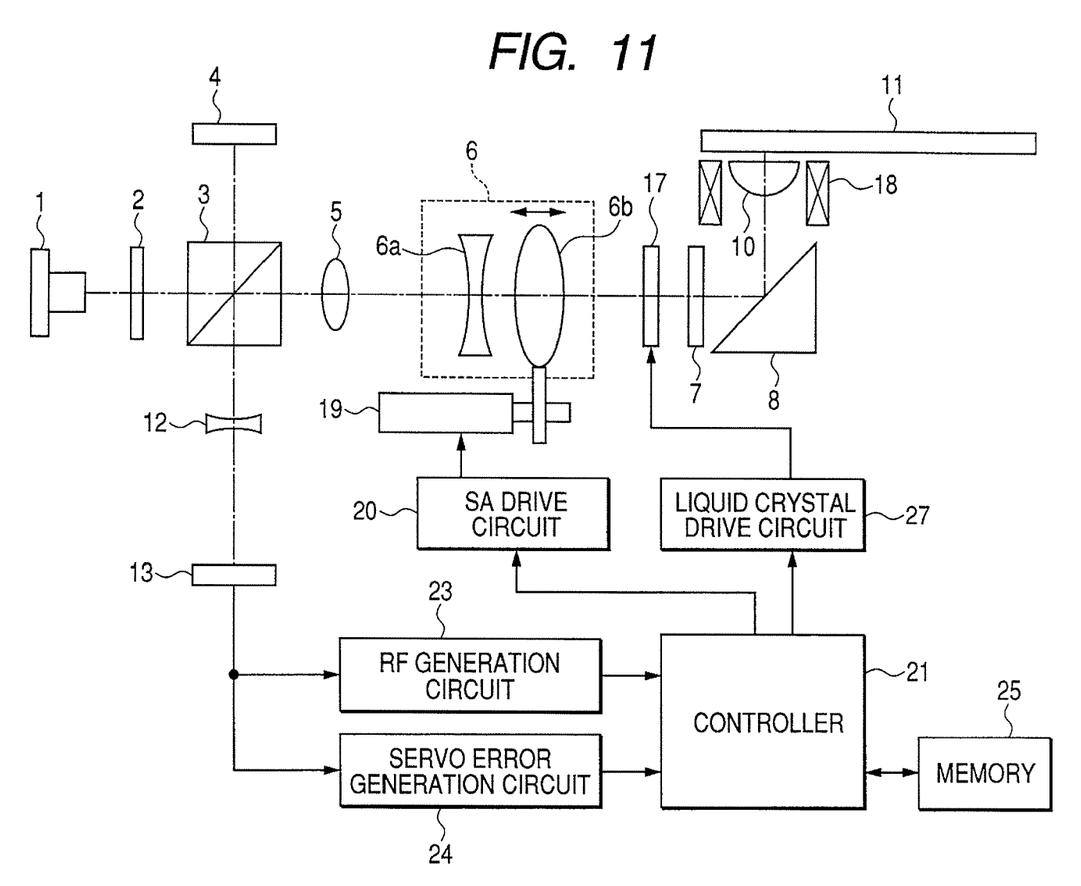
FIG. 11 is a block diagram illustrating an optical information recording and reproducing apparatus according to a fourth embodiment of the present invention.

FIG. 11 is a block diagram illustrating an optical information recording and reproducing apparatus according to a fourth embodiment of the present invention. In FIG. 11, like numerals are used to designate like or identical members illustrated in FIG. 1, and a description thereof is omitted. This embodiment differs from the one illustrated in FIG. 1 in that a liquid crystal coma correcting element 17 is provided between the light beam expander 6 and the lift mirror 8. A liquid crystal drive circuit 27 applies a drive voltage to the liquid crystal coma correcting element 17.

As the objective lens actuator 18, one having a drive mechanism for two-axis translation in a focus direction and in a radial direction of the optical disc 11 is used. The objective lens 10 is mounted on the objective lens actuator 18.

The semiconductor layer 1 has a wavelength of 405 nm. The first layer 11a and the second layer 11b of the optical disc 11 have substrate thicknesses of 100 µm and 70 µm, respectively. The NA of the objective lens 10 is 0.85, and is designed such that, when the transmission layer thickness is 100 µm, no aberration is caused in an infinite system.

Figure 12:
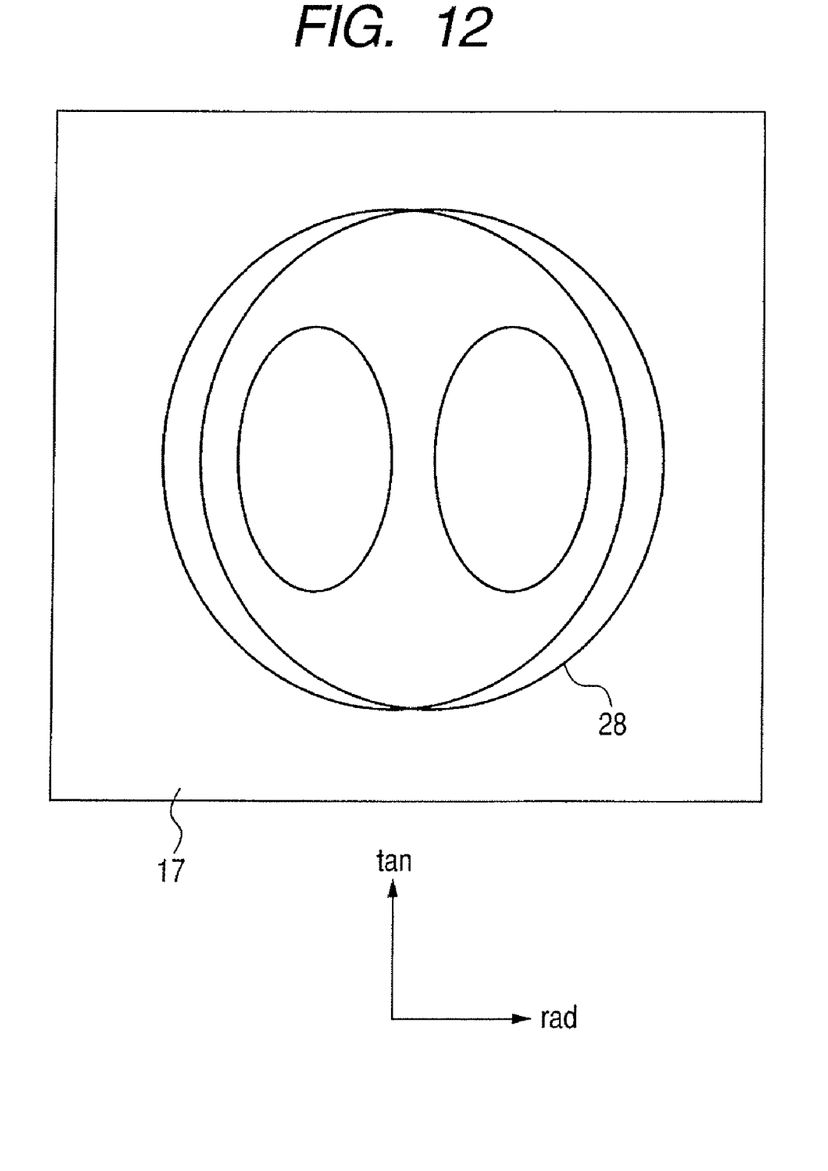
FIG. 12 illustrates an electrode pattern of a liquid crystal coma correcting element.

FIG. 12 illustrates an electrode pattern 28 of the liquid crystal coma correcting element 17. The electrode pattern 28 is similar in shape to coma aberration caused by disc tilt, and a phase difference can be generated according to a voltage applied to the electrode.

Figure 13:
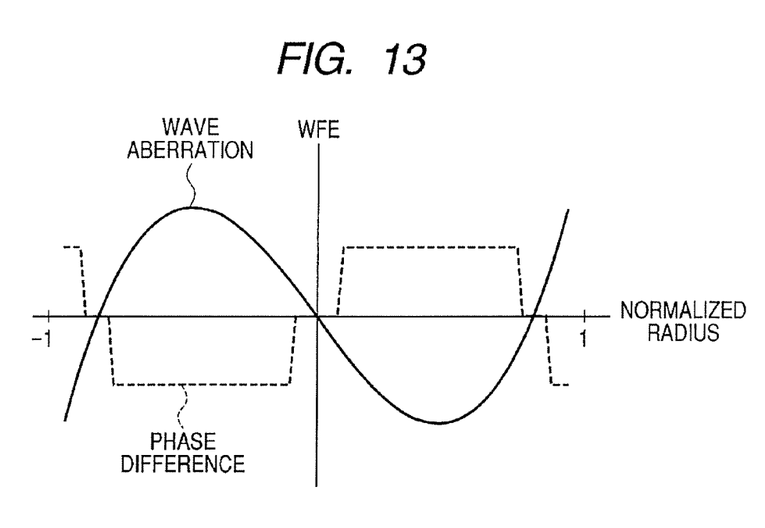
FIG. 13 illustrates wave aberration by coma aberration and a phase difference generated by the liquid crystal coma correcting element.
Figure 14:
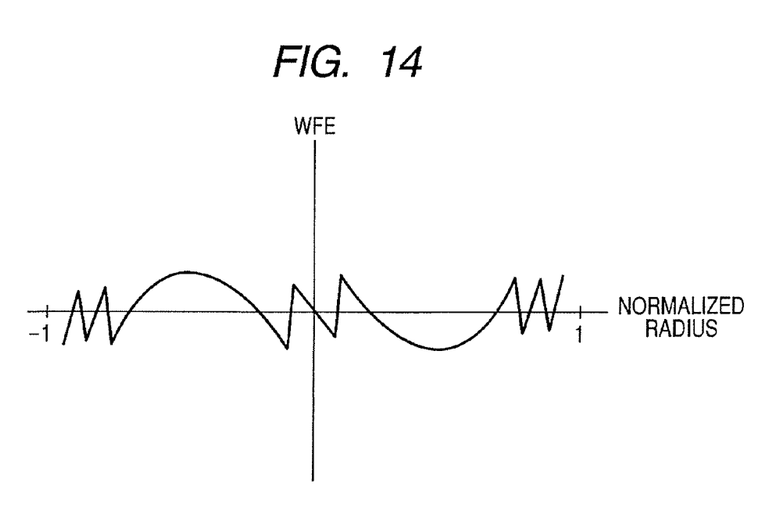
FIG. 14 illustrates wave aberration after correction by the liquid crystal coma correcting element.

FIG. 13 illustrates wave aberration by coma aberration, and phase difference generated by the liquid crystal coma correcting element 17, with a radial direction of the disc being the axis. Similarly, FIG. 14 illustrates wave aberration after correction. By giving a phase difference whose sign is opposite to that of the coma aberration caused, coma aberration can be corrected. It should be noted that the liquid crystal coma correcting element 17 is described in detail in, for example, Japanese Patent Application Laid-Open No. 2000-090479 and Japanese Patent Application Laid-Open No. 2000-003526.

Next, a case when an axis of incident light on the objective lens 10 is tilted by 0.5 degrees, due to an adjustment error, is described. Tilt of the objective lens 10 is adjusted so as to be in parallel to a disc surface.

First, a case without a disc tilt is described. A state where light beams from the semiconductor laser 1 are condensed onto the first layer 11a of the optical disc 11 and spherical aberration is optimized by the light beam expander 6, and a state where light beams from the semiconductor laser 1 are condensed onto the second layer 11b and spherical aberration is optimized by the light beam expander 6 are compared with each other. In this case, while the amount of coma aberration caused in the first layer 11a is almost zero, coma aberration of 44 mλrms is caused in the second layer 11b.

Next, a case with a disc tilt of 0.3 degrees is described. Similarly, a state where light beams are condensed onto the first layer 11a of the optical disc 11 and spherical aberration is optimized by the light beam expander 6, and a state where light beams are condensed onto the second layer 11b and spherical aberration is optimized by the light beam expander 6 are compared with each other. In this case, while coma aberration of 32 mλrms is caused in the first layer 11a, coma aberration of 66 mλrms is caused in the second layer 11b.

Next, operation of this embodiment is now described. Similarly, when power is turned on, when a disc is changed, or the like, optimization of voltage applied to the liquid crystal coma correcting element 17 is performed. First, the controller 21 adjusts the position of the convex lens 6b of the light beam expander 6, such that spherical aberration is corrected in the first layer 11a of the optical disc 11, and the first layer 11a is brought into focus. Also, in this case, as described above, the position of the convex lens 6b is adjusted such that the amplitude of the RF reproduction signal becomes the largest.

Further, the controller 21 controls the liquid crystal drive circuit 27 for driving the liquid crystal coma correcting element 17, and detects the amplitude of a push-pull signal with the voltage applied to the liquid crystal coma correcting element 17 being varied. The drive voltage applied to the liquid crystal coma correcting element 17, with which the amplitude of the push-pull signal becomes the largest, is detected as the optimal drive signal for the first layer 11a.

Next, the position of the convex lens 6b of the light beam expander 6 is adjusted to the second layer 11b of the optical disc 11, and the second layer 11b is brought into focus. Similarly, the amplitude of the push-pull signal is detected with the voltage applied to the liquid crystal coma correcting element 17 being varied, and the voltage applied to the liquid crystal coma correcting element 17, with which the amplitude of the push-pull signal becomes the largest, is detected as the optimal drive signal for the second layer 11b. The optimal drive signals for the first layer 11a and the second layer 11b, respectively, are stored in the memory 25.

For example, when there is almost no disc tilt, the voltage applied with regard to the first layer 11a is almost zero, and the voltage applied with regard to the second layer 11b is optimized, so as to correct the coma aberration of 44 m$\lambda$rms. When there is a disc tilt of 0.3 degrees, the voltage applied with regard to the first layer 11a is optimized, so as to correct the coma aberration of 32 m$\lambda$rms, and the voltage applied with regard to the second layer 11b is optimized, so as to correct the coma aberration of 66 m$\lambda$rms.

Then, to write or to read data to/from the optical disc 11, depending on which recording layer of the optical disc 11 is used for recording or reproducing the data, the optimal drive voltage stored in the memory 25 is applied by the liquid crystal drive circuit 27 to the liquid crystal coma correcting element 17.

First, a case when the read/write operation is performed on the first layer 11a of the optical disc 11 is described. The controller 21 controls the liquid crystal drive circuit 27, such that the optimal drive signal corresponding to the first layer 11a and stored in the memory 25, is applied to the liquid crystal coma correcting element 17. Next, the position of the convex lens 6b of the light beam expander 6 is adjusted to the first layer 11a of the optical disc 11, and the first layer 11a is brought into focus to read or to write information with respect thereto.

When the read/write operation is performed on the second layer 11b of the optical disc 11, similarly, the optimal drive signal corresponding to the second layer 11b and stored in the memory 25 is applied by the liquid crystal drive circuit 27 to the liquid crystal coma correcting element 17. Next, the position of the convex lens 6b of the light beam expander 6 is adjusted to the second layer 11b, and the second layer 11b is brought into focus to read or to write information with respect thereto.

It should be noted that, in this embodiment, a push-pull signal is used as an indicator of optimization of the tilt, but any indicator may be used, insofar as the signal is related to the amount of tilt. For example, the amplitude of an RF reproduction signal may be used. Further, in this embodiment, a two layer medium is used, but the present invention may also be applied to a multilayer medium having three or more layers.

As described above, according to this embodiment, different drive voltages are applied to the liquid crystal coma correcting element, with regard to different recording layers of the optical disc to be subjected to the read/write operation. Therefore, even when coma aberration is corrected by a liquid crystal element, the correction is not affected by fluctuations in the amount of coma aberration caused due to entry of finite light beams when large spherical aberration is corrected, and stable recording or reproducing in the respective layers of a multilayer medium can be conducted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical information recording and reproducing apparatus for performing, using a light beam, at least one of recording information on and reproducing recorded information from a plurality of recording layers on an information recording medium, said apparatus comprising:
   an objective lens for receiving a light beam and for condensing the light beam onto the plurality of recording layers of the information recording medium, to perform the at least one of recording and reproducing of the information;
   a light beam expander for correcting spherical aberration caused by a difference in substrate thickness between the plurality of recording layers of the information recording medium by changing one of a divergent angle and a convergent angle of the light beam entering the objective lens;
   coma aberration correcting means for correcting coma aberration caused by tilt of the recording medium; and
   a drive circuit for driving the coma aberration correcting means with a drive signal having a value that varies for each of the plurality recording layers, depending on (i) an amount of coma aberration caused by correcting spherical aberration by changing one of the divergent angle and the convergent angle by the light beam expander, and (ii) an amount of coma aberration caused in each recording layer due to a transmission thickness from a light incidence surface of the recording medium to each of the plurality of the recording layers.

2. An optical information recording and reproducing apparatus according to claim 1, wherein the coma aberration correcting means corrects coma aberration by tilting the objective lens.

3. An optical information recording and reproducing apparatus according to claim 1, wherein the coma aberration correcting means corrects coma aberration by applying a drive signal to a liquid crystal element disposed in an optical path from a light source to the recording medium.

4. An optical information recording and reproducing apparatus according to claim 1, further comprising:
   a detection circuit for detecting, in advance, a drive signal value for the coma aberration correcting means with regard to each of the recording layers of the recording medium; and
   a memory circuit for storing a drive signal value with regard to each of the recording layers,
   wherein the drive circuit drives the coma aberration correcting means based on the drive signal value stored in the memory circuit with regard to each of the recording layers of the recording medium.

5. An optical information recording and reproducing apparatus according to claim 4, wherein the detection circuit detects a drive signal value for a reference recording layer corresponding to one of the plurality of recording layers of the recording medium and when one of the recording and reproducing is performed on a recording layer other than the reference recording layer, the drive circuit drives the coma aberration correcting means with a drive signal having a value obtained by multiplying the drive signal value for the reference recording layer by a predetermined factor.

6. An optical information recording and reproducing apparatus according to claim 4, wherein the detection circuit measures a predetermined indicator related to an amount of drive of the coma aberration correcting means with the amount of drive being varied, and detects a drive signal value based on a result of measurement of the predetermined indicator.

7. An optical information recording and reproducing apparatus according to claim 6, wherein the predetermined indicator comprises one of an amplitude of a push-pull signal and an amplitude of an RF reproduction signal and the detection circuit detects a drive signal value with which the amplitude of the push-pull signal or the amplitude of the RF reproduction signal becomes the largest.

8. An optical information recording and reproducing apparatus according to claim 1, further comprising:

a tilt detector for detecting tilt of the recording medium; and a circuit for calculating a drive signal value for the coma aberration correcting means based on an output of the tilt detector, wherein the drive circuit drives the coma aberration correcting means with the calculated drive signal value when one of the recording and reproducing is performed on a reference recording layer, among the plurality of recording layers of the recording medium, and drives the coma aberration correcting means with a drive signal value obtained by multiplying the calculated drive signal value by a predetermined factor when one of the recording and reproducing is performed on a recording layer other than the reference recording layer.

9. An optical information recording and reproducing apparatus according to claim 1, wherein the objective lens has a numerical aperture of 0.85.

* * * * *